(12) United States Patent
Tsukada

(10) Patent No.: US 8,259,791 B2
(45) Date of Patent: Sep. 4, 2012

(54) DIGITAL SIGNAL PROCESSING DEVICE, DISPLAY DEVICE, AND PROGRAM

(75) Inventor: Noboru Tsukada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 883 days.

(21) Appl. No.: 12/366,421

(22) Filed: Feb. 5, 2009

(65) Prior Publication Data

US 2009/0196340 A1   Aug. 6, 2009

(30) Foreign Application Priority Data

Feb. 6, 2008  (JP) ................................ 2008-025908

(51) Int. Cl.
*H04N 7/12* (2006.01)
(52) U.S. Cl. ................................. 375/240.01
(58) Field of Classification Search ............. 375/240.01
See application file for complete search history.

(56) References Cited

U.S. PATENT DOCUMENTS

| 7,394,989 B2 | 7/2008 | Ozeki et al. |
| 7,523,241 B2 | 4/2009 | Konishi |
| 2007/0055876 A1 | 3/2007 | Choi |
| 2007/0283071 A1* | 12/2007 | Konishi ............... 710/302 |
| 2008/0155639 A1* | 6/2008 | Miyagi ................ 725/139 |
| 2008/0303956 A1* | 12/2008 | Nakagawa ........... 348/723 |

FOREIGN PATENT DOCUMENTS

| JP | 2000-041196 A | 2/2000 |
| JP | 2007-36854 A | 2/2007 |

* cited by examiner

*Primary Examiner* — Michael Pyzocha
(74) *Attorney, Agent, or Firm* — AdvantEdge Law Group, LLC

(57) ABSTRACT

In at least one embodiment of the disclosure, a digital signal processing device is configured to receive a TMDS signal and a hot-plug signal via a digital signal cable. A TMDS signal determination section is configured to determine whether the TMDS signal has been received. A hot-plug signal determination section is configured to determine whether the hot-plug signal has been received every t seconds when the TMDS signal has not been received. A digital signal determination section is configured to determine that a digital signal is present if the TMDS signal is received. A digital signal is determined absent if (a) the hot-plug signal has not been received n times (n being an integer equal to or greater than one), or (b) the hot-plug signal has been received m times (m being an integer equal to or greater than two and m being greater than n).

7 Claims, 4 Drawing Sheets

DIGITAL SIGNAL PROCESSING DEVICE, DISPLAY DEVICE, AND PROGRAM

CROSS-REFERENCE

The present application claims priority from Japanese Patent Application No. 2008-025908 filed on Feb. 6, 2008, which is hereby incorporated by reference in its entirety.

BACKGROUND

For digital signal processing devices such as display devices inputting a digital signal via a digital signal cable such as a High-Definition Multimedia Interface (HDMI) terminal or a Digital Visual Interface (DVI) terminal it may be difficult to determine whether or not an electronic apparatus for outputting a digital signal is connected to the digital signal cable because of the standard of the digital signal cable (see, for example, Japanese Patent Publication No. JP-A-2007-36854).

In such digital signal processing devices, a method of determining whether or not the electronic apparatus is connected based on a presence or absence of a Transition Minimized Differential Signaling (TMDS) signal has been adopted.

However, since some of the electronic apparatuses output the TMDS signal after a High-bandwidth Digital Content Protection (HDCP) certification has finished, it may take time before the TMDS signal is input to the digital signal processing device, and therefore, it may also take time before it is determined that the TMDS signal will not be input.

For example, if a digital signal cable for coupling an electronic apparatus and a digital signal processing device is detached therefrom, it takes about five seconds for a typical digital signal processing device before notifying the user of the no signal state. This may contribute to a poor user experience or make the user feel anxious.

SUMMARY

Digital signal processing devices, display devices, and program products have been developed in response to the current state of the art, and in particular, in response to these and other problems, needs, and demands that have not been fully or completely solved by currently available devices. More specifically, various embodiments described in the disclosure provide digital signal processing devices, display devices, and program products that may more quickly determine an absence of a digital signal input via a digital signal cable.

A digital signal processing device according to certain embodiments of the disclosure include a TMDS signal input section adapted to input a TMDS signal via a digital signal cable, a hot-plug signal input section adapted to input a hot-plug signal via the digital signal cable, a TMDS signal determination section adapted to determine whether or not the TMDS signal has been input, a hot-plug signal determination section adapted to determine whether or not the hot-plug signal has been input every t second in the case in which the TMDS signal has not been input, and a digital signal determination section adapted to determine that input of the digital signal is present if the TMDS signal is input, and determine that the input of the digital signal via the digital signal cable is absent if the hot-plug signal has not been input n times (n is an integer equal to or greater than one) or if the hot-plug signal has been input m times (m is an integer equal to or greater than two, and n<m is satisfied).

Further, a computer program product according to other embodiments of the disclosure allows a computer including a TMDS signal input section adapted to input a TMDS signal via a digital signal cable, a hot-plug signal input section adapted to input a hot-plug signal via the digital signal cable, to function as a device including a TMDS signal determination section adapted to determine whether or not the TMDS signal has been input, a hot-plug signal determination section adapted to determine whether or not the hot-plug signal has been input every t second in the case in which the TMDS signal has not been input, and a digital signal determination section adapted to determine that input of the digital signal is present if the TMDS signal is input, and determine that the input of the digital signal via the digital signal cable is absent if the hot-plug signal has not been input n times (n is an integer equal to or greater than one) or if the hot-plug signal has been input m times (m is an integer equal to or greater than two, and n<m is satisfied).

According to certain embodiments, the digital signal processing device and so on determine not only the presence or absence of the TMDS signal input but also the presence or absence of the hot-plug signal, and sets a determination threshold number for the number of times of the absence of the hot-plug signal input to be smaller than a determination threshold number for the number of times of the presence of the hot-plug signal input in determining the absence of the digital signal input, thus the absence of the digital signal input via the digital signal cable can more quickly be determined.

Further, a digital signal processing device according to certain embodiments of the disclosure includes a TMDS signal input section adapted to input a TMDS signal via a digital signal cable, a hot-plug signal input section adapted to input a hot-plug signal via the digital signal cable, a TMDS signal determination section adapted to determine whether or not the TMDS signal has been input, a hot-plug signal determination section adapted to determine whether or not the hot-plug signal has been input in the case in which the TMDS signal has not been input, and a digital signal determination section adapted to determine that input of the digital signal is present if the TMDS signal is input, and determine that the input of the digital signal via the digital signal cable is absent if the hot-plug signal has not been input for equal to or greater than n×t seconds (n is an integer equal to or greater than one) or if the hot-plug signal has been input for equal to or greater than m×t seconds (m is an integer equal to or greater than two, and n<m is satisfied).

Further, a computer program product according to certain embodiments allows a computer including a TMDS signal input section adapted to input a TMDS signal via a digital signal cable, a hot-plug signal input section adapted to input a hot-plug signal via the digital signal cable, to function as a device including a TMDS signal determination section adapted to determine whether or not the TMDS signal has been input, a hot-plug signal determination section adapted to determine whether or not the hot-plug signal has been input every t second in the case in which the TMDS signal has not been input, and a digital signal determination section adapted to determine that input of the digital signal is present if the TMDS signal is input, and determine that the input of the digital signal via the digital signal cable is absent if the hot-plug signal has not been input for equal to or greater than n×t seconds (n is an integer equal to or greater than one) or if the hot-plug signal has been input for equal to or greater than m×t seconds (m is an integer equal to or greater than two, and n<m is satisfied).

According to at least one previously described embodiment, the digital signal processing device and so on determine not only the presence or absence of the TMDS signal input but also the presence or absence of the hot-plug signal, and sets a determination threshold period of time for the period of time of the absence of the hot-plug signal input to be smaller than a determination threshold period of time for the period of time of the presence of the hot-plug signal input in determining the absence of the digital signal input, thus the absence of the digital signal input via the digital signal cable can more quickly be determined.

Further, a display device according to certain embodiments includes the digital signal processing device described above, and a display section adapted to display an image indicating the absence of the input of the digital signal, if it has been determined by the digital signal determination section that input of the digital signal is absent.

According to this embodiment of the disclosure, the display device can, using the image, more rapidly communicate to the user the fact that the input of the digital signal is absent.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereinafter, embodiments of the disclosure applied to projectors will be described with reference to the accompanying drawings. It is to be understood that other embodiments may be utilized and structural or logical changes may be made without departing from the scope of the present disclosure. Therefore, the following description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a", "an", "one", and "the" may include reference to both the singular and the plural. Reference in the specification to "one embodiment" or "an embodiment" means that a particular feature, structure, or characteristic described in connection with the embodiment may be included in at least one embodiment of the disclosure. The meaning of "in" may include "in" and "on." The appearances of the phrases "in one embodiment" or "in an embodiment" in various places in the specification do not necessarily all refer to the same embodiment, but it may. Further, the terms "comprising", "having", and "including" should be considered synonymous, unless context dictates otherwise.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

First Embodiment

Figure 1:
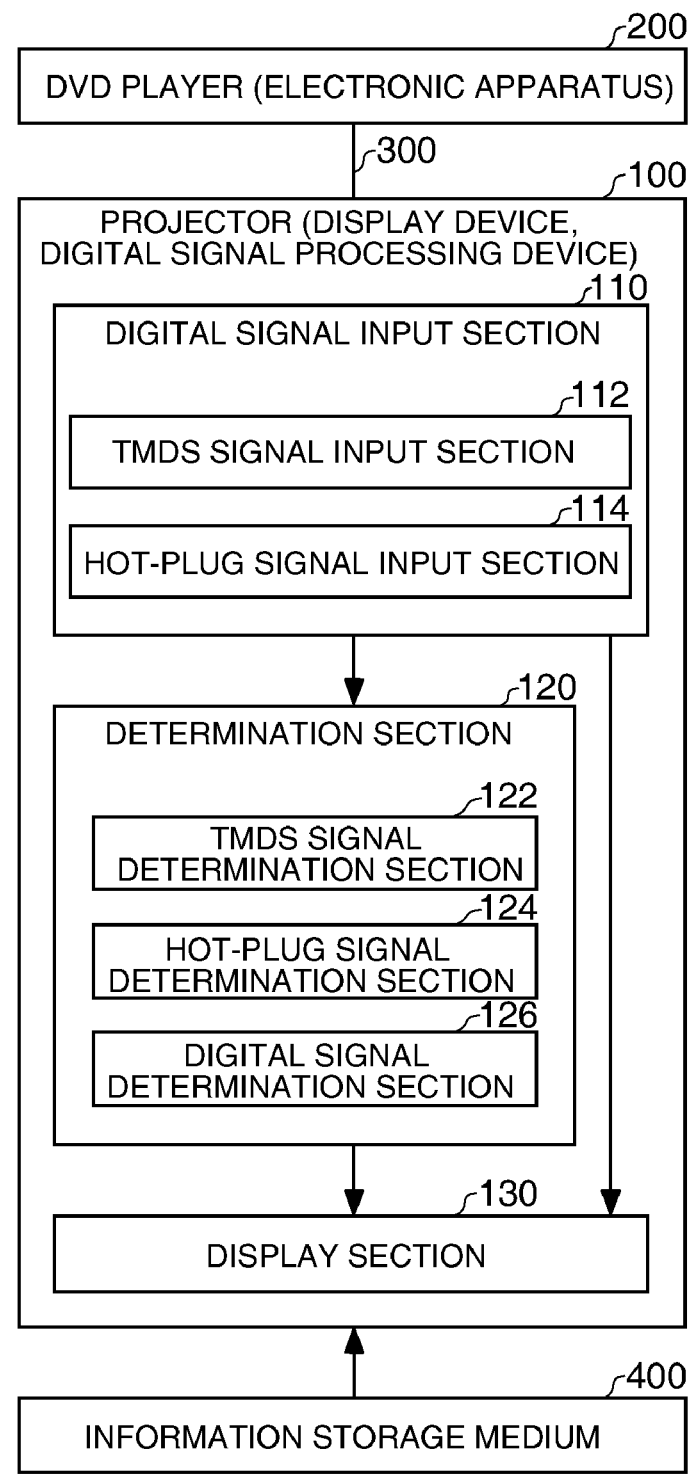
FIG. 1 is a functional block diagram of a projector according to certain embodiments of the disclosure.

FIG. 1 is a functional block diagram of a projector 100 according to at least one embodiment of the disclosure. The projector 100 as a kind of a display device inputs an image signal with a digital form from a DVD player 200 as a kind of an electronic apparatus via an HDMI cable 300 as a kind of a digital signal cable.

Further, the projector 100 also has a function as a digital signal processing device for inputting the image signal with the digital form to execute image processing. Specifically, the projector 100 may be configured to include a digital signal input section 110 for inputting an image signal from the DVD player 200 via the HDMI cable 300, a determination section 120 for determining a presence or absence of input of the image signal (a digital signal), and a display section 130 for displaying (projecting) the image based on the image signal.

Further, the digital signal input section 110 is configured to include a TMDS signal input section 112 for inputting the TMDS signal, and a hot-plug signal input section 114 for inputting a hot-plug signal. Further, the determination section 120 is configured to include a TMDS signal determination section 122 for determining whether the TMDS signal has been input, a hot-plug signal determination section 124 for determining, when the TMDS signal has not been input, whether the hot-plug signal has been input, and a digital signal determination section 126 for determining a presence or absence of the image signal based on these determination results.

It should be noted that as the hardware for implementing the functions of these sections in the projector 100, the following may be adopted. For example, the HDMI terminal and so on as the digital signal input section 110, a CPU and so on as the determination section 120, a lamp, a liquid crystal panel, a liquid crystal drive circuit, a projection lens, and so on as the display section 130 can be adopted. Further, the HDMI terminal is provided with a pin for inputting a TMDS clock (the TMDS signal), and a pin for inputting TMDS data (the TMDS signal), and these pins correspond to the TMDS signal input section 112. Further, the HDMI terminal is provided with a pin for inputting the hot-plug signal, and the pin corresponds to the hot-plug signal input section 114.

Further, the projector 100 may implement the functions of the determination section 120 and so on by retrieving a software program stored in an information storage medium 400. The information storage medium 400 may be, for example, a CD-ROM, DVD-ROM, ROM, RAM, and/or HDD, and either of the loading types of the software program, a contact type and a noncontact type, may be adopted.

Figure 2:
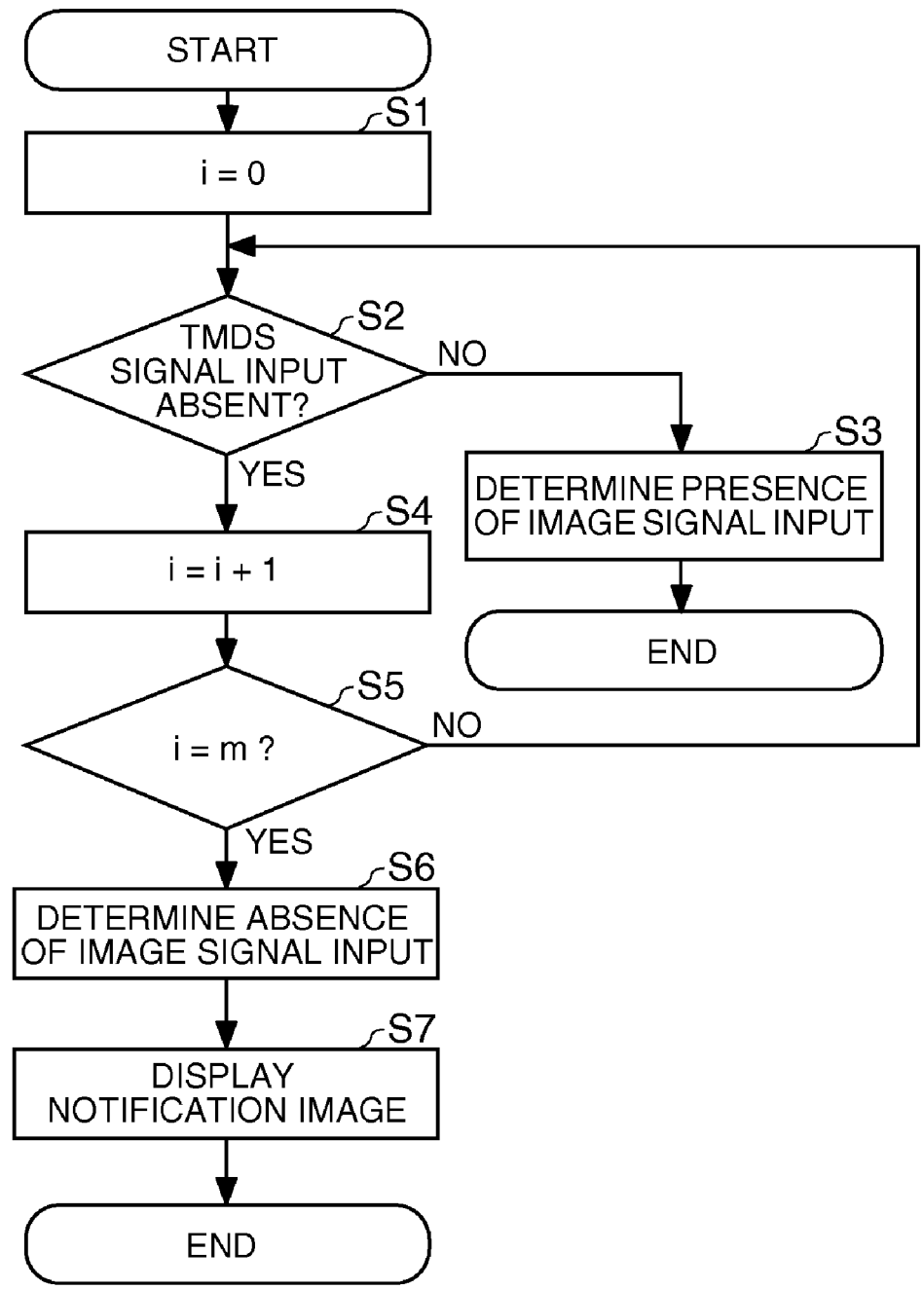
FIG. 2 is a flowchart illustrating a digital signal determination processing procedure.

Next, a digital signal determination processing procedure in a projector of related art will be explained. FIG. 2 is a flowchart showing a conventional digital signal determination processing procedure.

The projector sets a variable i equal to zero, as representing the number of times of absence of the TMDS signal input (step S1), and determines whether or not the input of the TMDS signal is absent every constant period of time (t seconds) (step S2). Further, in response to the input of the TMDS signal, the projector determines that the input of the image signal is present (step S3), and terminates the processing.

On the other hand, if the TMDS signal is not input, the projector adds one to the variable i (step S4), and determines whether or not the variable i satisfies the condition of i=m (step S5). For example, if t=0.05 is satisfied, m=100 is obtained.

If the condition of i=m is not satisfied, the projector repeats the process in steps S2 through S5. On the other hand, if the condition of i=m is satisfied, the projector determines that the input of the image signal is absent (step S6), and displays a notification image notifying the image signal is not input (step S7).

As described above, since the projector makes a determination based only on the TMDS signal, it takes at least 5 seconds for the projector to determine the input of the TMDS signal is absent.

Next, a digital signal determination processing procedure in accordance with certain embodiments of the disclosure will be explained.

Figure 3:
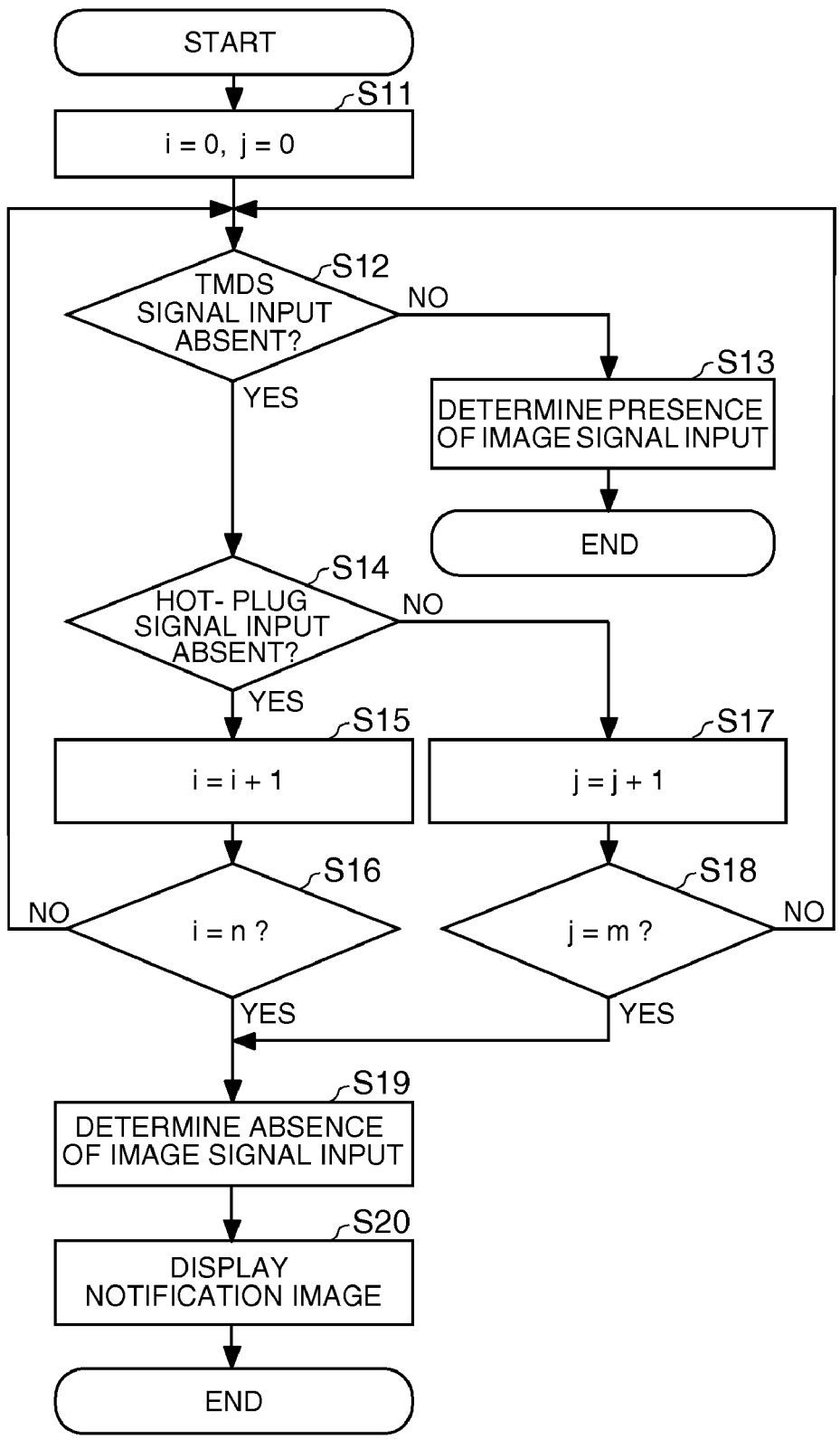
FIG. 3 is a flowchart illustrating a digital signal determination processing procedure according to certain embodiments of the disclosure.

FIG. 3 is a flowchart illustrating a digital signal determination processing procedure according to at least one embodiment of the disclosure. It should be noted that such processing is executed when, for example, the input source of the image signal for the projector 100 is switched to the HDMI cable 300. The method or procedure is described in terms of firmware, software, and/or hardware with reference to the flowchart. Describing a method by reference to a flowchart enables one skilled in the art to develop programs, including instructions to carry out the processes and methods on suitably configured computer systems and processing devices. In various embodiments, portions of the operations to be performed by the determination section 120 may constitute circuits, general purpose processors (e.g., micro-processors, micro-controllers, an ASIC, or digital signal processors), special purpose processors (e.g., application specific integrated circuits or ASICs), firmware (e.g., firmware that is used by a processor such as a micro-processor, a micro-controller, and/or a digital signal processor), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation (e.g., a hardware simulator), at least one of the processors of a suitably configured digital signal processing device executes the instructions from a storage and/or recording medium such as information storage medium 400. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it may be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by the digital signal processing device causes the processor to perform an action or to produce a result.

Firstly, the digital signal determination section 126 of the projector 100 of the present embodiment sets a variable i to zero, as representing the number of times the absence of the hot-plug signal input in the case in which the input of the TMDS signal is absent, and at the same time, sets a variable j to zero, as representing the number of times of presence of the hot-plug signal input in the case in which the input of the TMDS signal is absent (step S11).

The TMDS signal determination section 122 determines whether or not the input of the TMDS signal is absent every constant period of time (t seconds) (step S12). Further, in response to the input of the TMDS signal, the projector 100 determines that the input of the image signal is present (step S13), and terminates the processing.

On the other hand, if the TMDS signal is not input, the hot-plug signal determination section 124 determines whether the input of the hot-plug signal is absent (step S14). If the hot-plug signal is not input, the digital signal determination section 126 adds one to the variable i (step S15), and determines whether or not the variable i satisfies the condition of i=n (step S16), where n is an integer equal to or greater than one.

If the TMDS signal is not input, and the hot-plug signal is input, the digital signal determination section 126 adds one to the variable j (step S17), and determines whether or not the variable j satisfies the condition of j=m (step S18). For example, if t=0.05 is satisfied, m=100 and n=10 are obtained. In other words, the digital signal determination section 126 uses m and n satisfying a relationship of n<m and m is an integer equal to or greater than two.

If neither the condition of i=n nor the condition of j=m is satisfied, the projector 100 repeats the process of steps S12 through S18. On the other hand, if either one of the conditions of i=n and j=m is satisfied, the projector 100 determines that the input of the image signal is absent (step S19), and the display section 130 displays a notification image for notifying that the image signal is not input (step S20). For example, the notification image may display an image showing a character string such as "SOURCE: HDMI" or "NO VIDEO SIGNAL INPUT."

As described above, the projector 100 determines not only the presence or absence of the TMDS signal input but also the presence or absence of the hot-plug signal, and sets a determination threshold number for the number of times of the absence of the hot-plug signal input to be smaller than a determination threshold number for the number of times of the presence of the hot-plug signal input in determining the absence of the image signal input, thus the absence of the image signal input via the HDMI cable 300 can more quickly be determined.

Further, it is possible for the projector 100 to more rapidly display the absence of the image signal input. As such, the user may more quickly and easily adjust to the case in which the HDMI cable 300 has been detached from the HDMI terminal.

Second Embodiment

Figure 4:
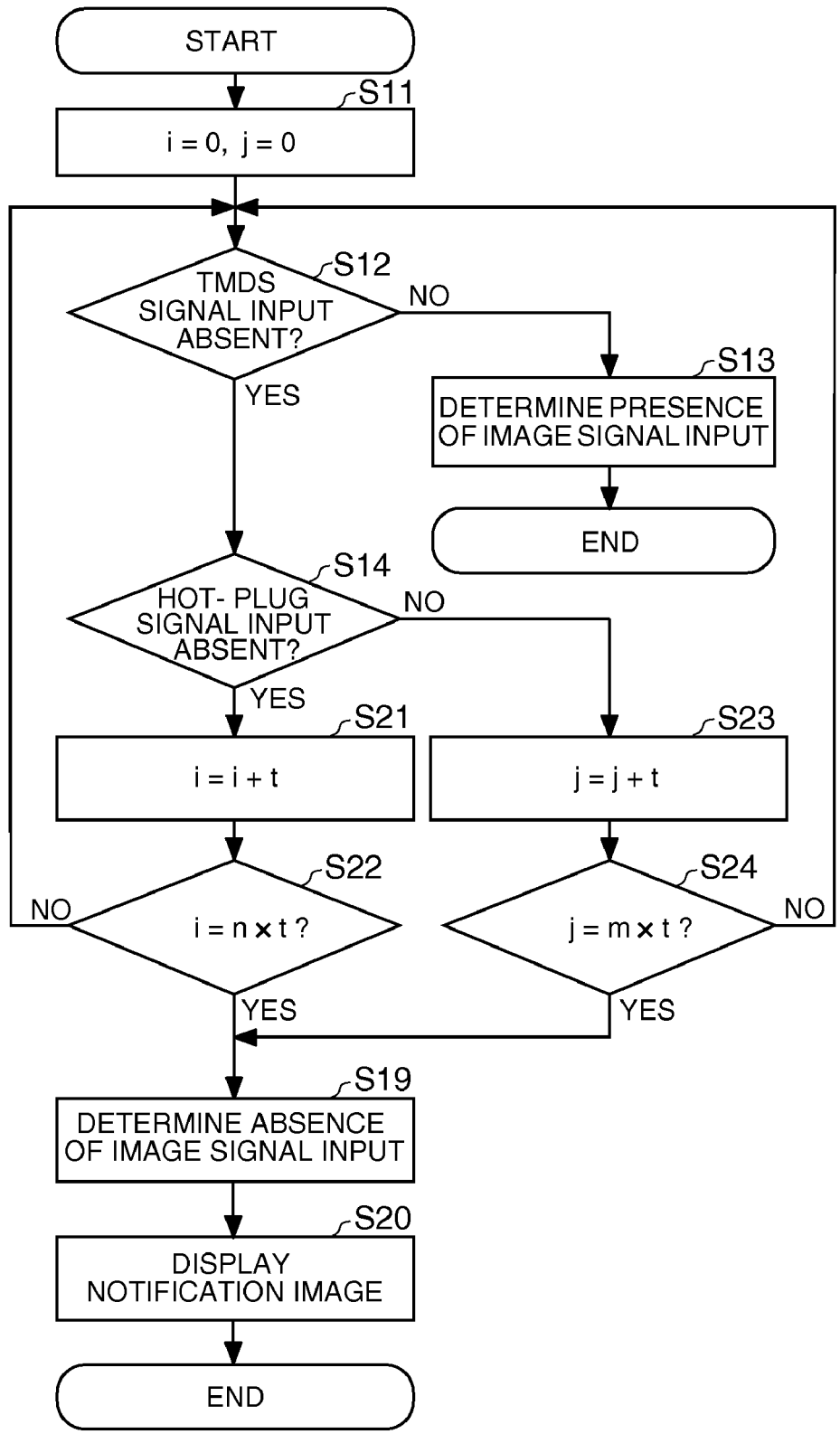
FIG. 4 is a flowchart illustrating a digital signal determination processing procedure according to alternative embodiments of the disclosure.

According to at least one previously described embodiment the projector 100 makes the determinations based on the number of times. However, it is possible to make determinations based on periods of time. FIG. 4 is a flowchart illustrating a digital signal determination processing procedure according to other embodiments of the disclosure.

In these embodiments, the projector 100 treats the variable i as a variable representing a period of time during which the hot-plug signal input is absent in the case in which the input of the TMDS signal is absent, and the variable j as a variable representing a period of time during which the hot-plug signal input is present in the case in which the input of the TMDS signal is absent.

Therefore, the digital signal determination section 126 executes a process of setting i+t in i (step S21) instead of the setting process in the step S15, and determines whether or not the condition of i=n×t is satisfied (step S22) instead of the determination process in the step S16. Further, the digital signal determination section 126 executes a process of setting j+t in j (step S23) instead of the setting process in the step S17, and determines whether or not the condition of j=m×t is satisfied (step S24) instead of the determination process in the step S18.

In other words, in the present embodiments, the variable i is used as the variable representing the time period during which the input of the hot-plug signal is absent in the case in which the input of the TMDS signal is absent, and the variable j is used as the variable representing the time period during which the input of the hot-plug signal is present in the case in which the input of the TMDS signal is absent. It should be noted that the processes other than these processes are substantially the same as in the embodiments illustrated above, therefore detailed explanations will be omitted.

As described, the projector 100 may exhibit substantially the same functions and advantages as in the embodiments described above except that the projector 100 executes the processing using periods of time instead of using numbers of times.

Other Embodiments

It should be noted that applications of the present disclosure is not limited to the embodiments described above, but various modifications thereof are possible. For example, the digital signal cable is not limited to the HDMI cable 300, but can be a DVI cable or the like. Further, the specific values of the m, n, and t are values varying in accordance with the circuits and so on the disclosure is applied to, and are not limited to the numerical values in the embodiments described above.

Further, the digital signal determination section 126 can continuously count the number of times or the period of time to be the criteria for determining the absence of the digital signal input. For example, it is also possible that the digital signal determination section 126 determines whether or not j=0 is satisfied if i=n is not satisfied in the step S16, and sets j to zero to initialize j if j=0 is not satisfied. Further, it is also possible that the digital signal determination section 126 determines whether or not i=0 is satisfied if j=m is not satisfied in the step S18, and sets i to zero to initialize i if i=0 is not satisfied.

According to the above process, the digital signal determination section 126 can continuously count the number of times and the period of time to be the criteria for determining the absence of the digital signal input, and it is possible to determine the absence of the digital signal input in a condition in which the presence or absence of the hot-plug signal does not vary.

Further, in the case with the cable capable of additionally transmitting an audio signal such as the HDMI cable 300, the digital signal determination section 126 can also determine presence or absence of the audio signal input. Further, the medium of notifying of the presence or absence of the digital signal input is not limited to an image. For example, the digital signal processing device can make notification using a sound (e.g., outputting a voice such as "no video signal is input" from a speaker), light (e.g., illuminating a warning lamp, or illuminating an input notification lamp), or vibration (e.g., vibrating the controller when the digital signal input is absent).

Further, the display device is not limited to the projector 100, but can be, for example, a television or a liquid crystal monitor. Further, the digital signal processing device is not limited to the projector 100, but various devices inputting a digital signal via a digital signal cable, such as a television, a liquid crystal monitor, or an amplifier may be used as the digital signal processing device. Further, the electronic apparatus for outputting the digital signal to the digital signal processing device via the digital signal cable is not limited to the DVD player 200, but can be, for example, an HDD recorder, a set-top box, or an amplifier.

Further, the projector 100 is not limited to a liquid crystal projector, but may be, for example, a projector using a Digital Micromirror Device™ (DMD™). It should be noted that DMD™ is a trademark of Texas Instruments Incorporated. Further, the function of the projector 100 may be implemented in two or more devices (e.g., a PC and a projector) in a distributed manner.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A digital signal processing device comprising:
an input terminal that includes:
   a TMDS signal input section having at least one pin configured to receive a TMDS signal via a digital signal cable;
   a hot-plug signal input section having at least one pin configured to receive a hot-plug signal via the digital signal cable;
a TMDS signal determination section configured to determine whether the TMDS signal has been received;
a hot-plug signal determination section configured to determine, in response to the determination that the TMDS signal has not been received, whether the hot-plug signal has been received every t seconds; and
a digital signal determination section configured to determine that a digital signal is present if the TMDS signal is received, and configured to determine that the digital signal is absent if (a) the hot-plug signal has not been received n times (n being an integer equal to or greater than one), or (b) the hot-plug signal has been received m times (m being an integer equal to or greater than two and m being greater than n),
wherein the TMDS signal determination section, the hot-plug signal determination section, and the digital signal determination section are each tangibly embodied as computer instructions stored on at least one non-transitory storage medium and executable by at least one processor.

2. A display device comprising:
the digital signal processing device according to claim 1; and
a display section including at least one of a lamp, a liquid crystal panel, a liquid crystal drive circuit, and a projection lens, the display section being configured to display an image indicating the absence of the digital signal if it has been determined by the digital signal determination section that the digital signal is absent.

3. A digital signal processing device comprising:
an input terminal that includes:
  a TMDS signal input section having at least one pin configured to receive a TMDS signal via a digital signal cable;
  a hot-plug signal input section having at least one pin configured to receive a hot-plug signal via the digital signal cable;
a TMDS signal determination section configured to determine whether the TMDS signal has been received;
a hot-plug signal determination section configured to determine, in response to the determination that the TMDS signal has not been received, whether the hot-plug signal has been received; and
a digital signal determination section configured to determine that a digital signal is present if the TMDS signal is received, and configured to determine that the digital signal via the digital signal cable is absent if (a) the hot-plug signal has not been received for equal to or greater than n×t seconds (n being an integer equal to or greater than one), or (b) the hot-plug signal has been received for equal to or greater than m×t seconds (m being an integer equal to or greater than two and m being greater than n),
wherein the TMDS signal determination section, the hot-plug signal determination section, and the digital signal determination section are each tangibly embodied as computer instructions stored on at least one non-transitory storage medium and executable by at least one processor.

4. A display device comprising:
the digital signal processing device according to claim 3; and
a display section including at least one of a lamp, a liquid crystal panel, a liquid crystal drive circuit, and a projection lens, the display section being configured to display an image indicating the absence of the digital signal if it has been determined by the digital signal determination section that the digital signal is absent.

5. A computer program product comprising computer instructions stored on at least one non-transitory storage medium and executable by a device, the device including a TMDS signal input section configured to input a TMDS signal via a digital signal cable, and a hot-plug signal input section configured to input a hot-plug signal via the digital signal cable, the instructions executable by the device to perform the functions of:
  a TMDS signal determination section configured to determine whether the TMDS signal has been input;
  a hot-plug signal determination section configured to determine whether the hot-plug signal has been input every t seconds in the case in which the TMDS signal has not been input; and
  a digital signal determination section configured to determine that an input of a digital signal is present if the TMDS signal is input, and configured to determine that the input of the digital signal via the digital signal cable is absent if (a) the hot-plug signal has not been input n times (n being an integer equal to or greater than one), or (b) the hot-plug signal has been input m times (m being an integer equal to or greater than two and m being greater than n).

6. A computer program product comprising computer instructions stored on at least one non-transitory storage medium and executable by a device, the device including a TMDS signal input section configured to input a TMDS signal via a digital signal cable and a hot-plug signal input section adapted to input a hot-plug signal via the digital signal cable, the instructions executable by the device to perform the functions of:
  a TMDS signal determination section configured to determine whether the TMDS signal has been input;
  a hot-plug signal determination section configured to determine whether the hot-plug signal has been input in the case in which the TMDS signal has not been input; and
  a digital signal determination section configured to determine that an input of a digital signal is present if the TMDS signal is input, and configured to determine that the input of the digital signal via the digital signal cable is absent if (a) the hot-plug signal has not been input for equal to or greater than n×t seconds (n being an integer equal to or greater than one), or (b) the hot-plug signal has been input for equal to or greater than m×t seconds (m being an interger equal to or greater than two and m being greater than n).

7. A computer program product embodied in a non-transitory information storage medium and comprising computer instructions stored on the non-transitory information storage medium and executable by a digital signal processing device to perform the functions of:
  detecting whether a TMDS signal has been received from a digital signal cable;
  determining that a digital signal is present if the TMDS signal is detected;
  if the TMDS signal is not detected, detecting whether a hot-plug signal has been received from the digital signal cable; and
  indicating that the digital signal is absent if (a) the hot-plug signal has not been received n times (n being an integer equal to or greater than one), or (b) the hot-plug signal has been received m times (m being an integer equal to or greater than two and m being greater than n).

* * * * *